Jan. 29, 1952
A. C. A. SQUIRE
2,584,058
CONTROL MECHANISM FOR CHANGE-SPEED
GEARING ON MOTOR VEHICLES
Filed Aug. 24, 1949
3 Sheets-Sheet 1
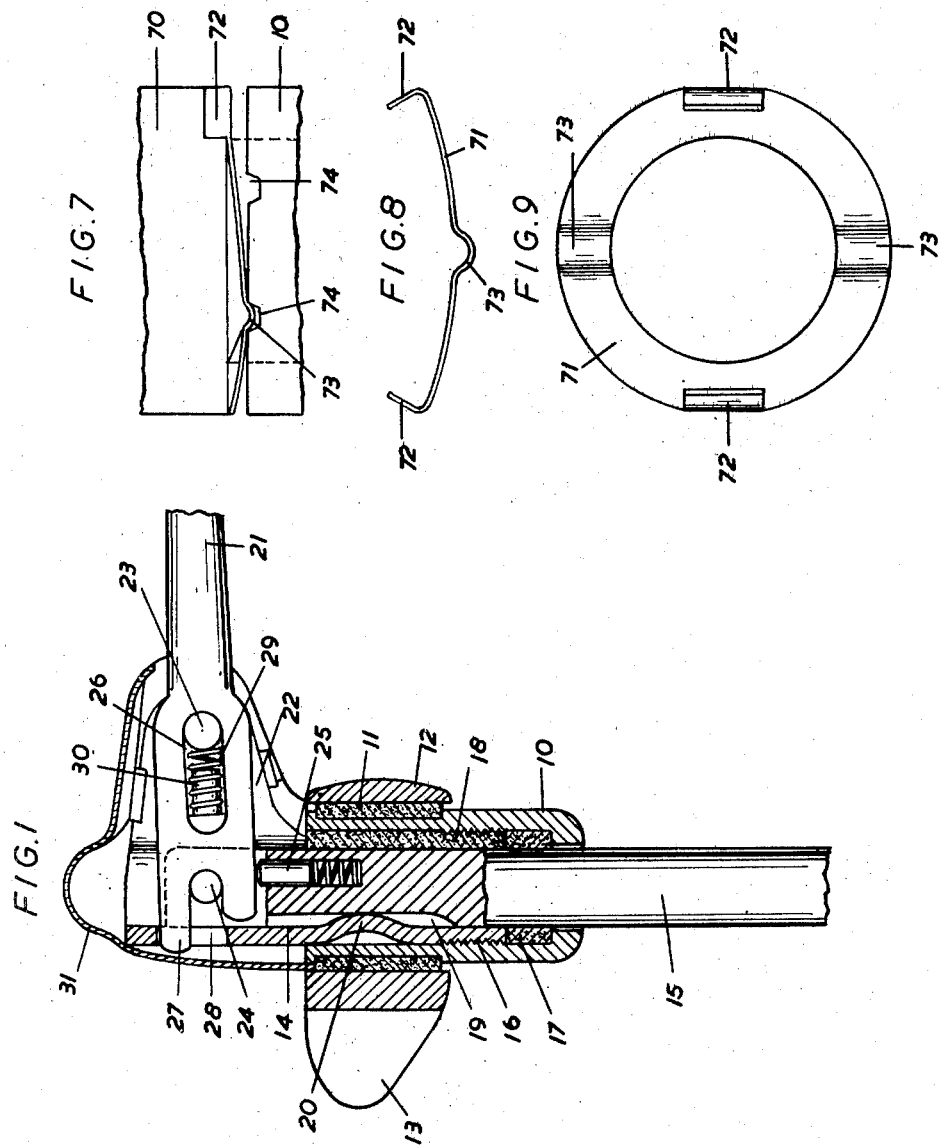
INVENTOR
ALEXANDER CECIL ALLDRITT SQUIRE
by Walter S. Pleston
ATTORNEY

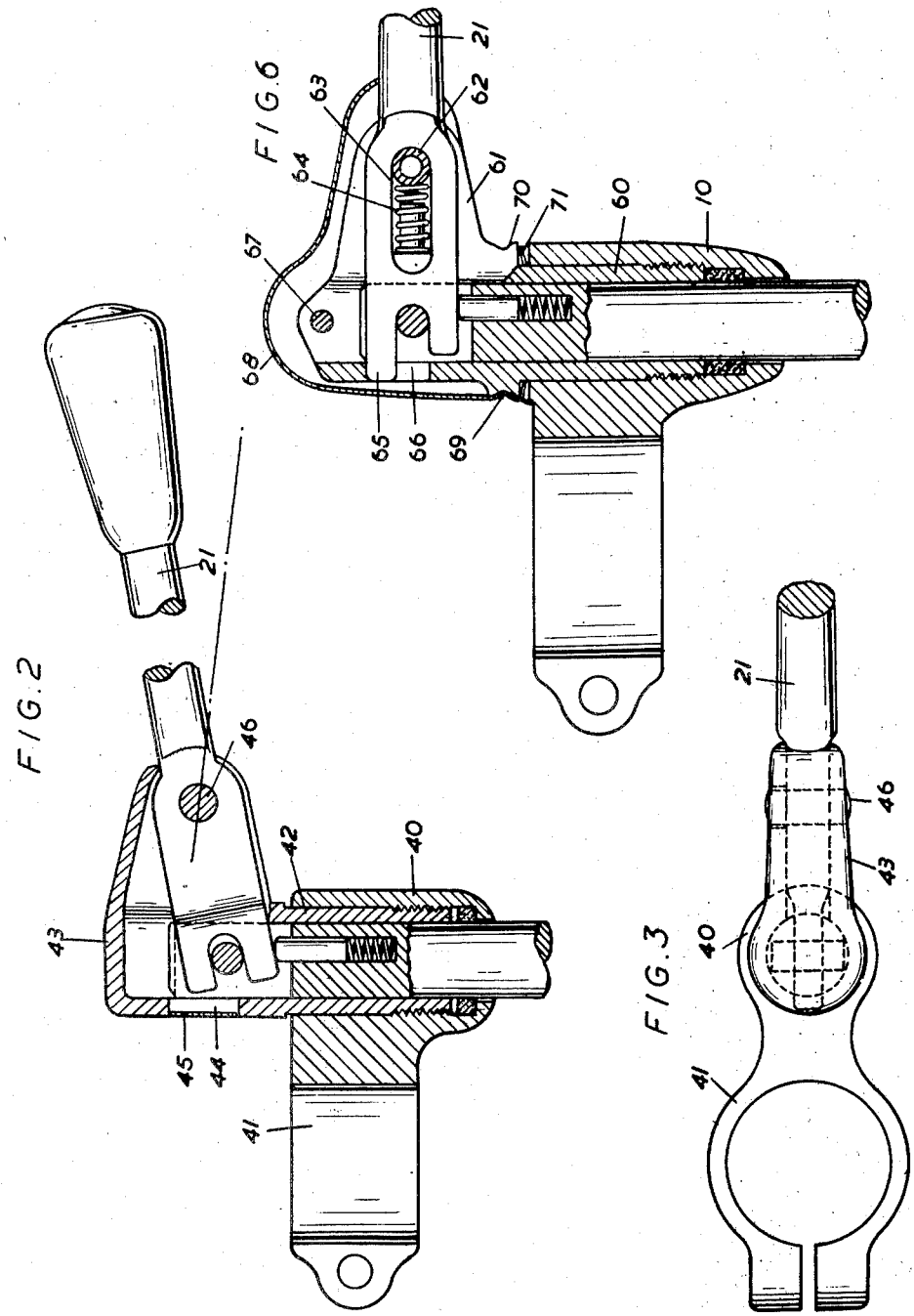

Jan. 29, 1952 A. C. A. SQUIRE 2,584,058
CONTROL MECHANISM FOR CHANGE-SPEED
GEARING ON MOTOR VEHICLES
Filed Aug. 24, 1949 3 Sheets-Sheet 3

INVENTOR
ALEXANDER CECIL ALLDRITT SQUIRE
by Walter S. Pleston
ATTORNEY

Patented Jan. 29, 1952

2,584,058

UNITED STATES PATENT OFFICE 2,584,058

CONTROL MECHANISM FOR CHANGE-SPEED GEARING ON MOTOR VEHICLES

Alexander Cecil Alldritt Squire, Bloxwich, England

Application August 24, 1949, Serial No. 112,012
In Great Britain August 27, 1948

6 Claims. (Cl. 74—484)

This invention relates to improvements in remote control mechanism for change-speed gearing on motor vehicles.

It is becoming common practice in private cars to operate the gear change by means of a hand lever mounted below the steering wheel instead of being mounted directly on the cover of the gear-box, the advantages of that arrangement being that the floor is left clear so that the driver can enter or leave from either side of the car and two passengers can if necessary be accommodated on the front seat with the driver. The control lever extends horizontally below the steering wheel from the upper end of a housing for a gear-control rod parallel to the steering column and the selection of a gear is effected by a vertical movement of the rod and lever while the engagement is effected by an angular movement.

The object of my invention is to provide improved control mechanism of that type which is simple in construction and economical to manufacture and has a number of other advantages.

According to my invention control mechanism of the type set forth for change-speed gearing comprises a pivot bracket providing an axial bore for a plain cylindrical gear-control rod and an external cylindrical surface by which the bracket is mounted for angular movement in a mounting bracket adapted to be secured to the steering column of a vehicle, and a hand lever which is pivoted about a substantially horizontal axis in the upper end of the pivot bracket offset from the axis of the rod and is pivotally coupled to the upper end of the rod.

Vertical movement of the free end of the outer end of the hand lever rocks the lever about its pivot on the bracket and moves the rod vertically through its pivotal connection with the lever for gear selection, and horizontal movement of the lever moves the pivot bracket and rod angularly to engage a gear, the pivot bracket turning in its bearing in the mounting bracket on the steering column.

It will of course be understood that my improved construction of pivot bracket and gear control rod can be employed equally well for an arrangement in which the gears are selected by angular movement of the rod and engaged by axial movement.

Preferably the hand lever has a flattened and forked inner end which is received in an axially extending slot in the upper end of the rod and engages with a transverse pin in the rod extending across the slot to provide the pivotal connection between the lever and the rod. The pin only has to deal with the vertical movement of the rod for gear selection and the angular movement of the rod for gear-engagement is transmitted through the engagement of the forked end of the lever with the flat side faces of the slot in the rod.

The rod is a working fit in the bore in the pivot bracket which is a rigid member so that any tendency for the slot in the rod to open under a heavy torque such as might be produced by mishandling of the gear change is resisted by the pivot bracket. When the rod is being moved axially for gear-selecting there is of course no torque on it and there is no tendency for it to bind in the bracket.

If it is desired to relieve the slot in the rod of torque this can be done by slidably keying the rod to the pivot bracket so that angular movement of the hand-lever is transmitted to the rod through the bracket.

The pivot bracket may be pressed or folded from sheet metal, or it may be a die-casting or forging, or it may be fabricated from two or more parts produced by different methods and secured together by brazing, welding or by any other convenient method.

The gear-control rod is a plain cylindrical rod having no upset or forged parts so that it is extremely simple and economical to produce.

Further, the rod is coupled to the remainder of the assembly by a single pin and the hand lever and pivot bracket can be readily disengaged from the rod and can be supplied as a unit which takes up a minimum of space for packing and transport.

For the control of the gears in a gear-box having three forward speeds and reverse the hand lever will have two angularly spaced gear-engaging positions in each of two vertically spaced planes. For the control of a gear-box having four speeds and reverse the hand-lever is movable into a third plane to move the rod into a third vertical position for the engagement of reverse gear but is normally prevented from moving into that plane by a stop co-operating with an abutment on the pivot bracket, the stop being disengaged by a movement of the lever towards or away from the pivot bracket against the action of a spring.

It may in some cases be desirable to provide a stop to prevent the unintentional engagement of reverse gear even when the gear-box only has three forward speeds and reverse, first speed and reverse gear being engaged by angular movement of the hand-lever in opposite directions in the same plane.

For that purpose the hand-lever can be made movable towards and away from the pivot bracket against the action of a spring and a projection can be provided on the inner end of the lever to co-operate with a stop on the mounting bracket which prevents the lever from being moved angularly to engage reverse gear unless the lever has first been pulled outwardly or pressed inwardly.

If desired, there may be provided between the pivot bracket and the mounting bracket resilient locating means for definitely locating the pivot bracket and hand lever relative to the mounting bracket in each of the angular positions corresponding to the engagement of different gears. The locating means may also operate to hold the pivot bracket and lever in the position corresponding to neutral, but that should not normally be necessary.

A number of practical control mechanisms in accordance with my invention are diagrammatically illustrated by way of example in the accompanying drawings in which:

Figure 1 is a vertical section of one form of the mechanism and hand lever.

Figure 2 is a section similar to Figure 1 showing an alternative form of the mechanism designed for the control of a gear-box having three forward speeds and reverse.

Figure 3 is a plan of the mechanism shown in Figure 2.

Figure 6 is a section of another form of mechanism incorporating means for locating the pivot bracket in angular positions corresponding to the engagement of different gears.

Figure 7 is a fragmentary side elevation on a larger scale of the locating means shown in Figure 6.

Figures 8 and 9 are a side view and plan respectively on the same scale as Figure 7 of the resilient washer incorporated in the locating means shown in Figures 6 and 7.

Figure 4:
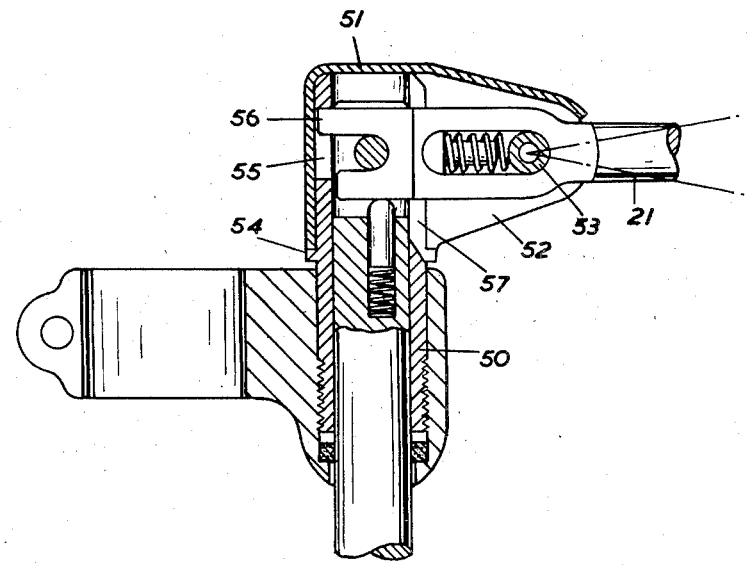
Figure 4 is a section similar to Figure 1 showing another form of the mechanism designed for the control of a gear-box having four forward speeds and reverse.

In the arrangement shown in Figure 1 the mounting bracket 10, which is in the form of a cylindrical sleeve or shell, is itself mounted in a bonded rubber bush 11 in a fitting 12 having lugs 13 for securing it to the steering column of a vehicle.

The bracket 10 has a cylindrical bore in which is mounted for angular movement a pivot bracket 14 formed by a pressing or folding operation from sheet metal. The bracket 14 has a cylindrical external surface which is a working fit in the bore in the mounting bracket 10 and has a cylindrical bore in which a plain cylindrical gear-control rod 15 is angularly and axially movable. The lower end of this rod is adapted to be connected in the known manner by any convenient linkage to the gear-selecting and engaging mechanism of the vehicle gear-box, the gears being selected by axial movement of the rod and being engaged by angular movement of the rod.

The lower end of the pivot bracket 14 is screw-threaded externally as shown at 16 and is screwed into a complementarily screw-threaded portion of the bore in the mounting bracket to locate the pivot bracket in an axial direction. An annular recess is formed in the wall of the mounting bracket below the screw-threaded part to receive packing 17 which engages the gear-control rod and prevents rattle as well as preventing oil from escaping over the surface of the rod.

As a further means to prevent rattle between the rod and the pivot bracket and between the latter and the mounting bracket 10 a wavy blade spring or a felt pad 18 may be mounted in the longitudinal gap in the pivot bracket pressing, the spring or pad bearing against the rod and the inner surface of the mounting bracket.

A longitudinal groove 19 is milled in the upper part of the rod 15 which lies within the pivot bracket and two parallel longitudinal slits are cut in the wall of the pivot bracket and the metal between them is pressed inwardly as shown at 20 to engage in the groove 19 and form a key or tongue slidably coupling the rod to the bracket.

If the pivot bracket is formed by a die-casting as described below with reference to Figures 2 and 3 a lug or projection may be cast in the bore of the bracket to engage in a longitudinal groove in the rod.

The hand-lever 21 is a rod of which the inner end is flattened to fit between two parallel lugs 22 extending laterally from the upper end of the pivot bracket and is pivoted to rock on a pin 23 passing transversely through the lugs. The inner extremity of the lever fits freely into a slot in the upper end of the gear-control rod 15 and is forked to engage a transverse pin 24 extending across the slot and coupling the hand-lever to the rod. The fork and the pin 24 only have to deal with the vertical movement of the rod 12 for gear selection as the angular movement of the rod for gear engagement is transmitted from the pivot bracket to the rod through the sliding key engagement between these parts.

It will be appreciated that on vertical movement of the knob at the outer end of the hand-lever 21 the lever rocks about the pin 23 to move the rod 15 vertically to select a gear, and then movement of the knob in a horizontal plane moves the rod and pivot bracket angularly in the mounting bracket to engage the selected gear.

To prevent rattle between the hand-lever and the gear-control rod a spring-loaded plunger 25 bearing against the underside of the forked inner end of the lever may be mounted in a longitudinal bore in the rod extending downwardly from the slot which receives the fork, this bore preferably being offset from the axis of the rod as shown.

If the mechanism is intended for the control of a gear-box having four forward speeds and reverse the hand-lever is formed with a longitudinal slot 26 for the pivot pin 23 and the upper limb of the forked end of the lever is extended as shown at 27 to work in a vertical slot 28 in the pivot bracket to form a reverse stop. The lever is normally held in the position shown in Figure 1 by a spring 29 housed in the slot 26 and bearing against the pin, the lever being pulled outwardly against the action of the spring to disengage the fork extension 27 from the slot 28 when it is desired to rock the lever into a position in which it moves the rod 15 far enough upwardly to select reverse gear. A plug 30 may be arranged in the slot 26 within the spring 29 to limit the outward movement of the lever and prevent any risk of it being withdrawn far enough to disengage the fork from the pin 24.

The mechanism is enclosed by a sheet-metal, plastic, or other cover or shroud 31 which fits over the upper part of the pivot bracket and the inner end of the lever and gives a neat finish as well as excluding dust and dirt.

In the arrangement shown in Figures 2 and 3 the mounting bracket 40 is integral with a split sleeve 41 adapted to fit over and be clamped on a vehicle steering column. The pivot bracket 42 is a die-casting in zinc-base alloy or other suitable material and includes an integral shroud 43 which encloses and conceals the upper end of the gear-control rod and the inner end of the hand-lever and can be made of any suitable design.

This mechanism is designed for the control of a gear-box having three forward speeds and reverse so that the lever only moves in two vertically spaced planes and no reverse stop is necessary. Preferably however a vertical slot 44 is cast in the pivot bracket and is closed by an inserted strip 45 so that the same bracket can be used for a control for a gear-box requiring a reverse stop. In that case the strip 45 is omitted and the hand-lever illustrated is replaced by one having a longitudinal slot for the pivot-pin 46 in the bracket and an extension on the upper limb of the fork at the inner end of the lever adapted to enter the slot 44 as described above with reference to Figure 1.

In an alternative construction the slot 44 in the die-casting may be replaced by a recess of the required axial length cast in the inner wall of the pivot bracket for the extension on the lever to work in. The recess does not extend through to the outer surface of the bracket so that the closing strip 45 is eliminated.

Figure 5:
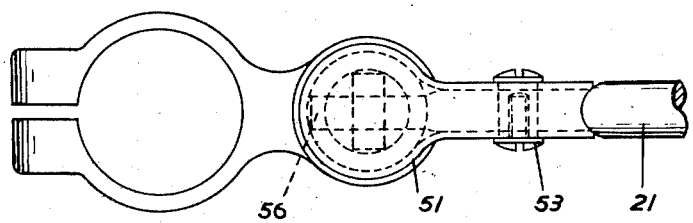
Figure 5 is a plan of the mechanism shown in Figure 4.

In the arrangement shown in Figures 4 and 5 the pivot bracket is fabricated from two parts, a sleeve part 50 which is machined from a bar or tube, and a pressing which incorporates the shroud 51 and the laterally extending lugs 52 which carry the pivot pin 53 for the hand-lever 21. The pressing fits over and is welded or brazed to the upper end of the sleeve part 50, the sleeve part preferably being formed with an annular shoulder or collar 54 against which the lower end of the pressing seats.

A slot 55 is machined in the upper part of the pivot bracket to receive the extension 56 of the hand-lever which forms a reverse stop, and a deep slot 57 extending from the top of the bracket is machined in its opposite side for the passage of the flattened inner end of the hand-lever.

In the arrangement shown in Figure 6 the pivot bracket 60 is made as a forging with integral laterally extending parallel lugs 61 on its upper part between which the hand-lever is pivoted on a pin 62. The mechanism illustrated is designed for the control of a gear-box having four forward speeds and reverse and the pin 62 works in a horizontal slot 63 in the hand-lever to allow the lever to be drawn outwardly against the action of a spring 64 to disengage an extension 65 on the inner end of the lever from a slot 66 in the wall of the upper part of the pivot bracket when it is desired to engage reverse gear. The angular position of the hand-lever to select reverse gear is defined by a stop peg 67 in the bracket with which the upper edge of the forked inner end of the lever is adapted to engage.

It will be understood that it would be a simple matter to provide a modified form of reverse stop which is disengaged by pressing the hand-lever inwardly towards the pivot bracket if that action is preferred.

The upper part of the pivot bracket and the inner end of the hand-lever are enclosed by a pressed sheet metal shroud 68 which is retained by a rib 69 on the lower part of the pressing which snaps into an annular groove in a collar or shoulder 70 on the pivot bracket.

On a vehicle in which the engine and gear-box form a unit which is flexibly mounted in the chassis and the connection between the lower end of the gear-control rod and the gear-selecting and engaging mechanism of the gear-box is sufficiently direct for movement of the power unit to be transmitted to the rod these movements tend to be transmitted to the hand-lever of the control mechanism, and any appreciable movement or vibration of that lever when the vehicle is running is objectionable from the driver's point of view.

It may be desirable therefore to provide means for eliminating or minimising such movements of the hand-lever by definitely locating the pivot bracket and hand-lever relative to the mounting bracket in each of the angular positions corresponding to the engagement of different gears.

One convenient means for achieving this is shown in Figure 6 and in more detail in Figures 7, 8 and 9. In Figure 7 10 is the upper end of the fixed mounting bracket and 70 is the collar or shoulder on the angularly movable pivot bracket which is in screw-threaded engagement with the mounting bracket as shown in Figure 6. Between the shoulder 70 and the upper end of the mounting bracket there is interposed a resilient washer 71 of the form shown in Figures 8 and 9. The washer comprises a ring of flat spring steel which is curved about a diameter to a shape conforming to the surface of a cylinder of large radius. The concave side of the ring is upper-most and at the two diametrically opposed highest points the ring has short lugs or tongues 72 which are upwardly cranked and engage in diametrically opposed notches or slots in the collar or shoulder on the pivot bracket.

At the two diametrically opposed points of the ring which are lowermost the metal of the ring is depressed to form radial ribs 73 of part-cylindrical form which are adapted to engage in radial grooves 74 having inclined sides formed in the upper end of the mounting bracket 10. There are two angularly spaced grooves on each side, and the ribs 73 on the ring engage in one pair of grooves in each angular position of the pivot bracket corresponding to the engagement of a gear.

If desired, a third pair of grooves may be provided for the ribs to engage in when the pivot bracket and lever are in the neutral position. Alternatively one rib may engage in one groove in the neutral position while the other rib engages in either of two angularly spaced grooves in the gear-engaging positions.

In assembling the mechanism the pivot bracket is screwed into the mounting bracket far enough to flatten the resilient ring to a certain extent so that the ring maintains an axial thrust between the two brackets and the ribs on the ring snap into engagement with the grooves in the mounting bracket as the pivot bracket and hand-lever move into each of the gear-engaging positions.

In an alternative arrangement a spring-loaded plunger is mounted in a recess or bore in the mounting bracket with its axis parallel to or at a small angle to the axis of the bracket and is adapted to engage in angularly spaced recesses in the lower face of the collar or shoulder on the pivot bracket when the pivot bracket and hand-lever are in each of their gear-engaging positions.

While the gear-control rod has been referred to throughout the above description as a plain cylindrical rod it will be understood that it need not be a solid rod. In order to reduce the weight of the rod it may be formed from a length of cylindrical steel or other tube having a cylindrical plug secured in its upper end, the plug being slotted transversely to receive the forked inner end of the hand-lever which engages with a pin extending across the slot.

I claim:

1. Control mechanism of the kind specified for change-speed gearing comprising a plain cylindrical gear control rod, a fixed mounting bracket having a cylindrical bore, a pivot bracket providing an axial bore to receive the gear control rod, and a cylindrical external surface for reception in the bore in the mounting bracket, a hand lever pivoted to rock about a substantially horizontal axis in the pivot bracket offset from the axis of the rod and pivotally coupled to the rod axially spaced radially extending surfaces on said mounting bracket and said pivot bracket, and a resilient locating means between said surfaces for locating the pivot bracket in angular positions corresponding to the engagement of different gears, said locating means comprising a resilient ring, means for keying the ring against angular movement relative to one bracket, at least one radial rib on said ring, and a plurality of angularly spaced radial grooves in the radially extending surface on the other bracket with which said rib engages.

2. Control mechanism of the kind specified for change-speed gearing comprising a plain cylindrical gear-control rod, a fixed mounting bracket having a cylindrical bore, a pivot bracket providing an axial bore to receive the gear-control rod and a cylindrical external surface for reception in the bore in the mounting bracket, a pair of spaced parallel lugs extending laterally from the upper end of the pivot bracket, a hand-lever lying between said lugs and pivoted to rock about a substantially horizontal pivot carried by said lugs, and a pivotal connection between the inner end of the hand-lever and a pin in the upper end of the gear-control rod, said connection including means to insure common turning of said lever and said rod about the axis of the latter.

3. Control mechanism of the kind specified for change-speed gearing comprising a plain cylindrical gear-control rod, a fixed mounting bracket having a cylindrical bore, a pivot bracket providing an axial bore to receive the gear-control rod and a cylindrical external surface for reception in the bore in the mounting bracket, a pair of spaced parallel lugs extending laterally from the upper end of the pivot bracket, a hand-lever pivoted to rock about a substantially horizontal pin carried by said lugs, a flattened and forked inner end on said hand-lever, a longitudinal slot in the upper end of said gear-control rod into which said forked inner end enters, and a pin extending across said slot with which said forked end engages.

4. Control mechanism as in claim 3 including a spring-loaded plunger mounted in a longitudinal bore in said gear-control rod and bearing against the lower edge of the forked inner end of the hand-lever to prevent rattle.

5. Control mechanism as in claim 3 including a stop for said hand-lever to prevent said lever from normally being moved into a position to engage reverse gear, said stop being disengaged by a movement of the lever in a direction at right angles to the axis of the pivot bracket.

6. Control mechanism as in claim 3 including stop means for normally preventing said hand-lever from being moved into a position to engage reverse gear, said stop means comprising a substantially horizontal slot in said lever for the pivot pin in the lugs on the pivot bracket to work in, a spring normally holding the lever in a position in which the pin lies at one end of said slot, an extension of one limb of the forked inner end of the hand-lever, and a longitudinal slot in the pivot bracket in which said extension normally lies, said extension being disengaged from said slot by a movement of the lever in a direction at right angles to the axis of the pivot bracket against the action of the spring when it is desired to engage reverse gear.

ALEXANDER CECIL ALLDRITT SQUIRE.

REFERENCES CITED

The following references are of record in the file of this patent:

UNITED STATES PATENTS

| Number | Name | Date |
| --- | --- | --- |
| 2,161,778 | Hey | June 6, 1939 |
| 2,193,230 | Ferguson | Mar. 12, 1940 |
| 2,202,949 | Girardi | June 4, 1940 |
| 2,242,038 | McCordic | May 13, 1941 |
| 2,257,852 | Nicol | Oct. 7, 1941 |
| 2,275,779 | MacPherson | Mar. 10, 1942 |
| 2,280,157 | Mead | Apr. 21, 1942 |
| 2,442,159 | Auten | May 25, 1949 |
| 2,478,356 | Auten | Aug. 9, 1949 |

FOREIGN PATENTS

| Number | Country | Date |
| --- | --- | --- |
| 614,658 | Great Britain | Dec. 20, 1948 |